(12) United States Patent
Spitz et al.

(10) Patent No.: US 10,024,208 B1
(45) Date of Patent: Jul. 17, 2018

(54) WORK VEHICLE HAVING OIL EQUIPMENT

(71) Applicant: KUBOTA CORPORATION, Osaka (JP)

(72) Inventors: David Spitz, Atlanta, GA (US); Hideki Aoki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/388,536

(22) Filed: Dec. 22, 2016

(51) Int. Cl.
*A01D 69/12* (2006.01)
*F01M 11/00* (2006.01)
*A01D 101/00* (2006.01)

(52) U.S. Cl.
CPC ......... *F01M 11/0004* (2013.01); *A01D 69/12* (2013.01); *A01D 2101/00* (2013.01); *B60Y 2200/223* (2013.01); *F01M 2011/0033* (2013.01)

(58) Field of Classification Search
CPC ........ F01M 11/0004; F01M 2011/0033; A01D 69/12; A01D 2101/00; B60Y 2200/223
USPC ....................................................... 180/69.1
See application file for complete search history.

(56) References Cited

U.S. PATENT DOCUMENTS

| | | | | |
|---|---|---|---|---|
| 4,986,777 A * | 1/1991 | Preston | ............... | F01M 11/0408 114/197 |
| 5,003,868 A * | 4/1991 | Higgins | ............... | A47J 37/1228 99/357 |
| 5,386,881 A | 2/1995 | Eshelman | | |
| 5,465,692 A * | 11/1995 | Uraki | ................. | F01M 11/0004 123/195 C |
| 6,427,427 B1 | 8/2002 | Dietz | | |
| 8,561,590 B1 * | 10/2013 | Spix | ................... | F01M 11/0004 123/195 C |
| 8,696,394 B1 * | 4/2014 | Langenfeld | ........ | F01M 11/0004 123/196 AB |
| 9,567,880 B2 * | 2/2017 | Shieh | ................. | F01M 11/0004 |
| 2002/0100641 A1 * | 8/2002 | Osman | ............... | F01M 11/0004 184/106 |
| 2010/0162988 A1 * | 7/2010 | Enokida | ............. | F01M 11/0004 123/195 C |
| 2010/0300395 A1 * | 12/2010 | Enokida | ............. | F01M 11/0004 123/195 R |
| 2012/0186554 A1 * | 7/2012 | Goerend | ............ | F01M 11/0004 123/196 R |
| 2013/0340706 A1 * | 12/2013 | Dubos | ................ | F01M 11/0004 123/196 R |
| 2015/0184562 A1 * | 7/2015 | Sato | ................... | F01M 11/0004 184/106 |
| 2015/0204436 A1 * | 7/2015 | Mafune | ............... | F16H 57/0409 475/160 |

(Continued)

*Primary Examiner* — James A Shriver, II
*Assistant Examiner* — Brian L Cassidy
(74) *Attorney, Agent, or Firm* — Greenblum & Bernstein, P.L.C.

(57) ABSTRACT

A work vehicle includes a vehicle body frame supported on a ground surface by wheels, a reinforcing plate provided in the vehicle body frame, an oil equipment using oil, and a drain pan configured to receive and discharge the oil discharged from the oil equipment. The reinforcing plate defines a drain hole extending vertically therethrough. A tilted face is provided in a face of the reinforcing plate. The tilted face extends with a downward inclination from a dropping point on the reinforcing plate for the oil discharged from the drain pan to the drain hole.

5 Claims, 5 Drawing Sheets

(56) References Cited

U.S. PATENT DOCUMENTS

2015/0252696 A1* 9/2015 Taguchi ............ F01M 11/0004
                                                    123/198 E
2016/0237868 A1* 8/2016 Bhosale ............ F01M 11/0004
2016/0245134 A1* 8/2016 Zandeh ............ F01M 11/0004
2016/0319715 A1* 11/2016 Shieh ................ F01M 11/0004

* cited by examiner

WORK VEHICLE HAVING OIL EQUIPMENT

TECHNICAL FIELD

The present invention relates to a work vehicle having an oil equipment using oil and a drain pan configured to receive and discharge oil discharged from the oil equipment.

BACKGROUND ART

A work vehicle mounts an engine, a speed changer device, etc. for driving a utility implement and a traveling device. Thus, in a circuit of e.g. lubricant oil, there is incorporated an oil equipment such as an oil filter. From such oil equipment, oil is discharged at the time of operation or maintenance inspection. From U.S. Pat. No. 5,386,881, there is known a grass mower machine configured such that oil is discharged to an outside of a blade housing by means of an expandable/contractible (telescopic) oil drain device that extends from an oil sump of an engine. This oil drain device consists of an outer tube fixed to the blade housing and an inner tube which moves like a piston within the outer tube. When oil is to be discharged, the inner tube will be drawn out of the outer tube until its leading end is exposed sideways from the blade housing. When not used, the inner tube will be fixedly threaded to the outer tube by a lock nut.

An oil drain device according to U.S. Pat. No. 6,427,427 comprises an oil drain valve formed integral with an engine mount flange attached to a top wall of a mower deck. An inlet of the oil drain valve is communicated to an oil sump formed in the engine mount flange. Oil exiting an outlet of this oil drain valve is discharged to the inside of the mower deck via a through hole defined n the mower deck.

SUMMARY

The oil drain device according to U.S. Pat. No. 5,386,881 has a drawback of it requiring large installment space and being structurally complicated. The oil drain arrangement according to U.S. Pat. No. 6,427,427 requires high manufacture costs as it is formed integral with an engine mount flange.

In view of the above, there is a need for a work vehicle having an oil drain arrangement which is more simple.

A work vehicle according to the present invention comprises:

a vehicle body frame supported on a ground surface by wheels;

an engine mounted on the vehicle body frame;

an oil equipment using oil;

a drain pan configured to receive and discharge the oil discharged from the oil equipment;

a reinforcing plate provided in the vehicle body frame to face the ground surface under the drain pan, the reinforcing plate defining a drain hole extending vertically therethrough; and a tilted face provided in a face of the reinforcing plate, the tilted face extending with a downward inclination from a dropping point on the reinforcing plate for the oil discharged from the drain pan to the drain hole.

With the oil drain arrangement of this work vehicle, oil discharged from the oil equipment flows in the drain pan and drops onto the tilted face formed in the reinforcing plate. This dropped oil will then flow along the tilted face and drop onto the ground via the drain hole formed in the reinforcing plate. This arrangement makes it possible to avoid outflow of oil over the entire reinforcing plate. In this, if there is employed an arrangement that this tilted face comprises a bottom face of a groove formed directly in the surface of the reinforcing plate, a lateral wall face of the groove will function as a guide face for the oil, thus ensuring entrance of the oil into the drain hole.

Further, according to a further embodiment, the tilted face for causing oil dropped from the drain pan to enter the drain hole can be formed by a sub drain pan as a separate component. This sub drain pan forms the tilted face and also an outlet for causing the oil running on the tilted face to flow into the drain hole. This sub drain pan comprises, as it were, a simple "rain gutter", which is mounted on the reinforcing plate so as to cause the dropped oil to flow into the drain hole. By forming the tilted face in a separate component to be mounted on the reinforcing plate, shaping work of the tilted face can be facilitated.

The drain hole for dropping oil onto the ground surface is formed in the reinforcing plate. If this drain hole can provide substantively adverse effect on the strength of the reinforcing plate, resultant shortage of reinforcing plate strength can be compensated for by the sub drain pan. For instance, if a bottom face of the sub drain pan is fixed by e.g. welding to an edge region of the drain hole of the reinforcing plate, then, the sub drain pan can function as a reinforcing member. Further, preferably, ribs are formed for increase of strength of the sub drain pan per se acting as such reinforcing member. In this, if the ribs are formed vertically along the circumference of the tilted face, these ribs will then act as a guide for guiding the oil running along the tilted face. Thus, an additional advantage can be obtained.

DETAILED DESCRIPTION

Figure 1:
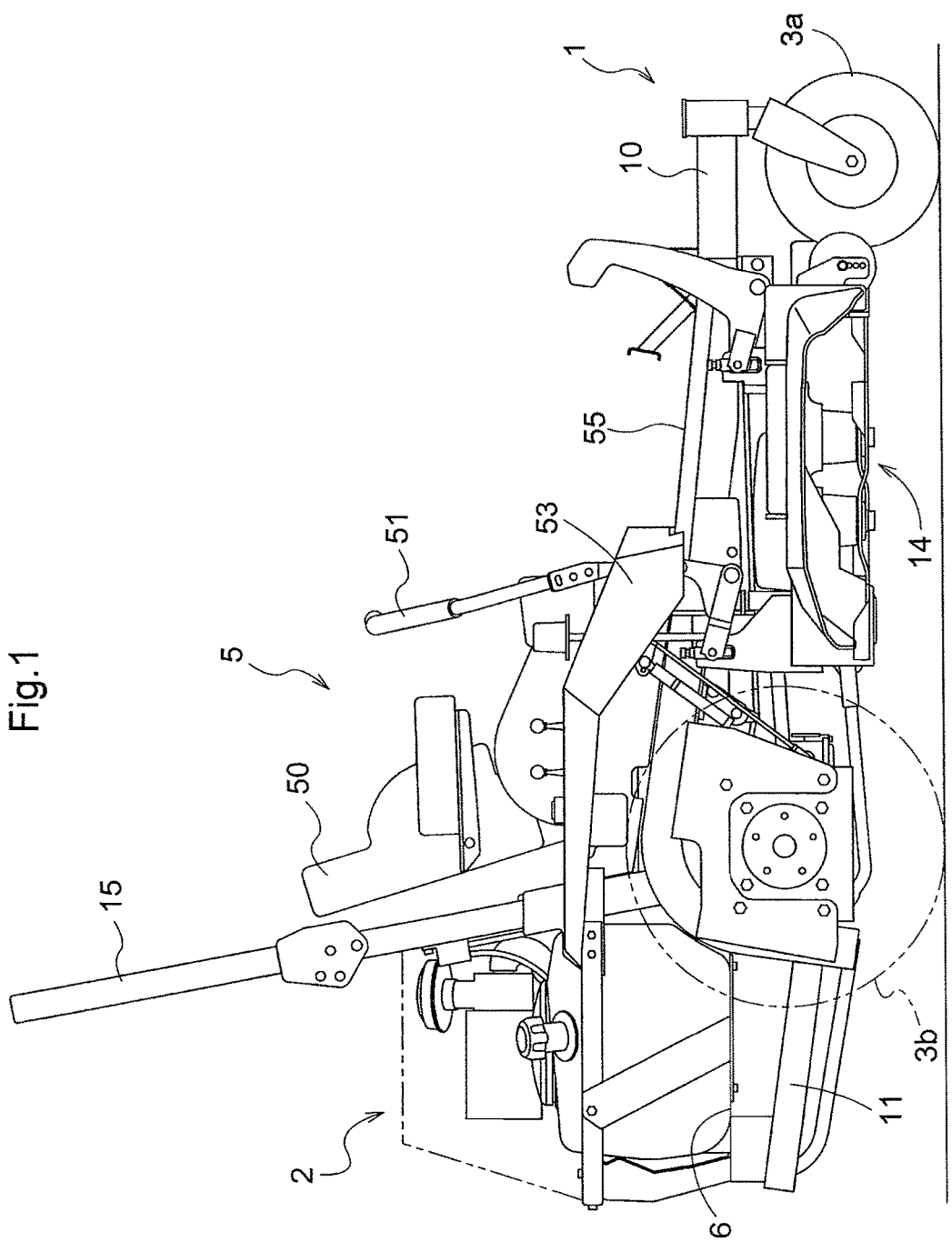
FIG. 1 is a side view showing a riding mower as one embodiment of a work vehicle.
Figure 2:
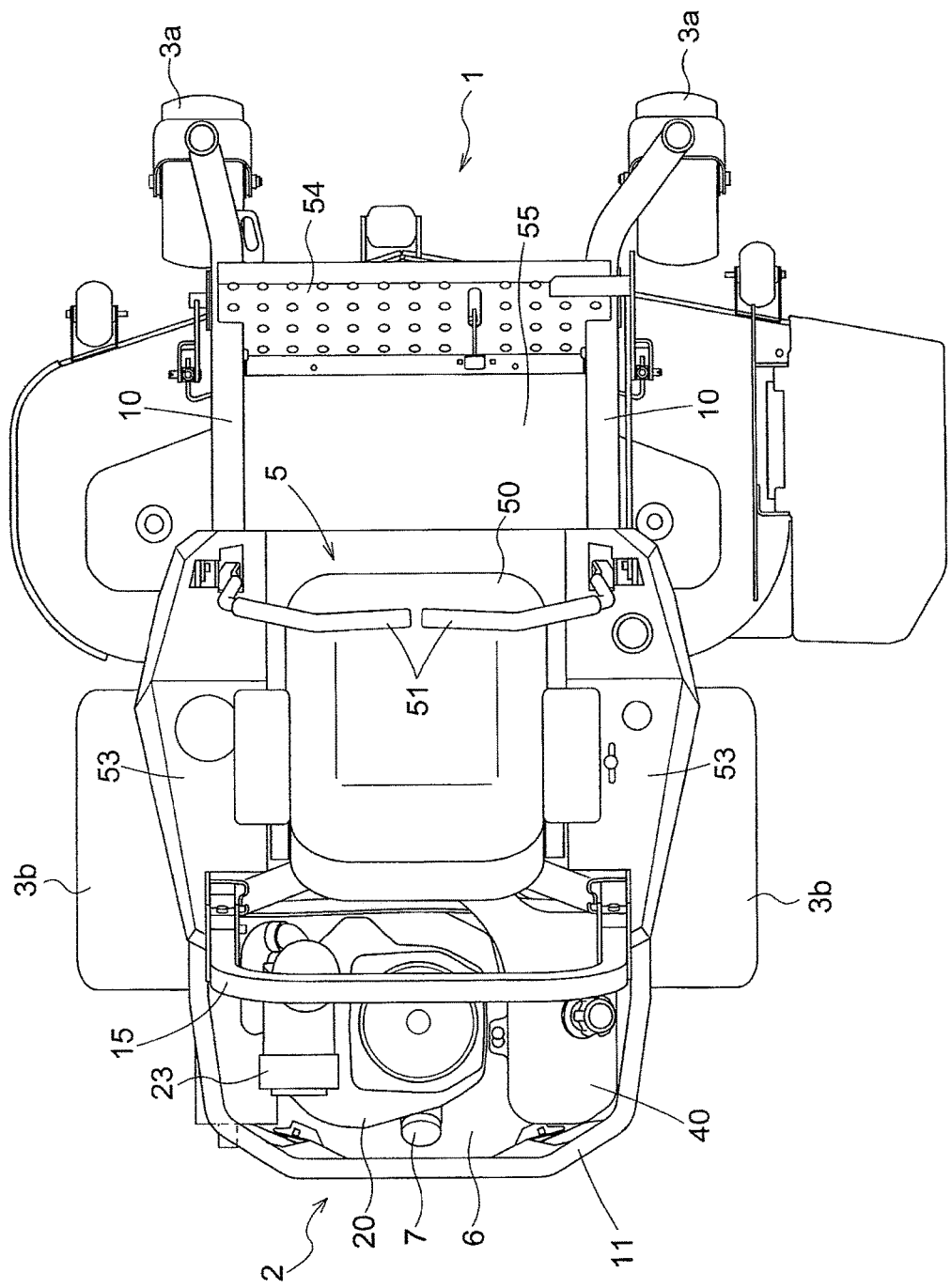
FIG. 2 is a plane view of the riding mower.

FIG. 1 and FIG. 2 show a riding mower as an example of work vehicle. This riding mower includes a vehicle body frame 1 which is supported by a pair of left and right front wheels 3a and a pair of left and right rear wheels 3b, with the respective rear wheels 3b being forward/reverse speed controllable independently of each other. Such riding mower is called a "zero-turn mower".

Principal constituting components of the vehicle body frame 1 are a pair of left and right front frame rails 10 formed of square pipe members and a rear frame 11 having a U-shape in its plane view. Between the pair of left and right front wheels 3a and the pair of left and right rear wheels 3b, a mower unit 14 is suspended via a lift mechanism from the front frame rails 10 to be liftable up/down.

On the front frame rails 10, a floor 55 formed of a metal plate is mounted in such a manner to cover them substantially entirely. At a front end of the floor 55, there is installed a footrest 64 formed of a thin plate. At a rear portion of the floor 55, a driving section 5 is formed at a position one-step raised from the floor 55. At the center of the driving section 5, a driver's seat 50 is mounted. On left and right opposed sides of the driver's seat 50, fenders 53 and steering levers 51 are disposed respectively. Incidentally, on the upper faces of the fenders 53, various operational levers, operational buttons, etc. are disposed. Rearwardly of the driver's seat 50, an arch-shaped ROPS 15 is mounted vertically. This ROPS 15 is formed of square pipe members. A driving section 2 is disposed in a region rearwardly of the ROPS 15 in a vehicle body front-rear direction. The driving section 2 includes an engine 20 which is an internal combustion engine and various engine auxiliary units.

To the U-shaped rear frame 11, there is installed a reinforcing plate 6 for reinforcing the rear frame 11. Further, the surface of the reinforcing plate 6 forms a substantially horizontal mounting face for mounting the engine 20. At the vicinity of the center of the reinforcing plate 6, the engine 20 is mounted under a posture with its output shaft protruding downwardly therefrom.

Figure 3:
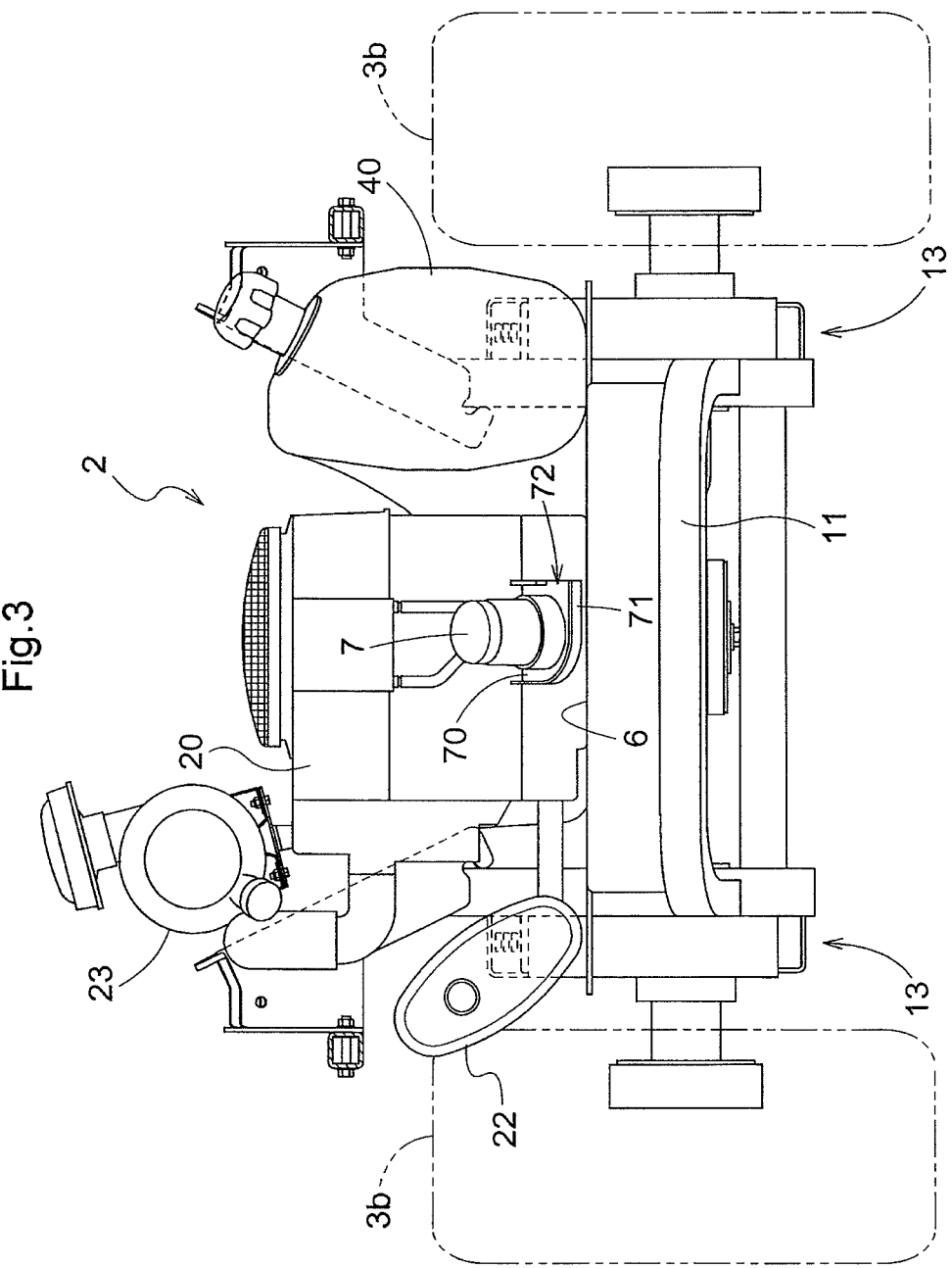
FIG. 3 is a rear view showing an engine and an oil filter.

As shown in FIG. 3, in a region on the right side of the engine 20, a fuel tank 40 is disposed. In a region on the left side of the engine 20, a muffler 22 is disposed. Upwardly of the engine 20, an air cleaner 23 is disposed. Rearwardly of the engine 20, an oil filter 7 is disposed as one oil equipment.

As shown schematically in FIG. 3, there is provided a transmission 13 configured to speed-change power from the engine 20 and to transmit the speed-changed power to the pair of left and right rear wheels 3b. The transmission 13 includes HSTs (hydrostatic transmissions) and a gear transmission mechanism. The respective HSTs are operated for speed change based on pivotal operations in the front-rear direction of the steering levers 51 provided on the left and right sides immediately forwardly of the driver's seat 50. When the left/right steering lever 51 is pivotally operated in the front-rear direction, the HST corresponding thereto can be operated for speed change, so that the left and right rear wheels 3b can be driven at various speeds independently of each other.

Figure 4:
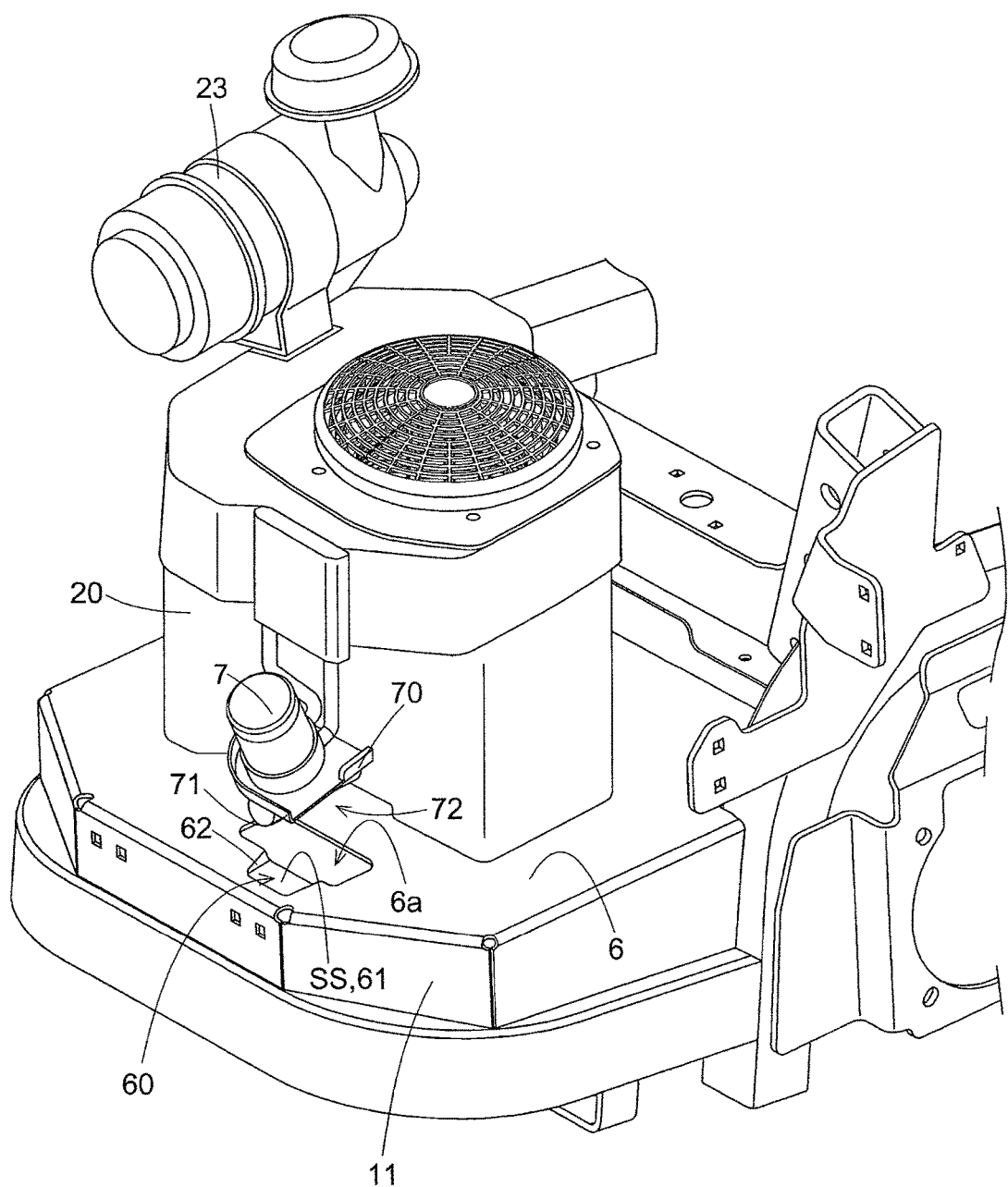
FIG. 4 is a perspective view showing one embodiment of an oil drain arrangement of the oil filter.

As shown in FIG. 3 and FIG. 4, the oil filter 7 is disposed rearwardly of the engine 20 and upwardly of the reinforcing plate 6. In a lower outer circumference of the oil filter 7, there is provided a drain pan 70 formed like a flange. This drain pan 70 receives oil discharged from the oil filter 7. A vertical wall 71 is provided in an outer circumference of the drain pan 70, except a part thereof. And, the part where the vertical wall 71 is not provided functions as a discharge outlet 72 for discharging oil accumulated in the drain pan 70 downwards. Discharged oil will drop onto the surface of the reinforcing plate 6.

At a portion of the reinforcing plate 6, in particular, at a position downwardly of the oil filter 7 in this example, there is formed a drain hole 6a which vertically extends the reinforcing plate 6 therethrough. Further, the reinforcing plate 6 defines a groove 60 which extends from a dropping point on the reinforcing plate 6 for oil discharged from the discharge outlet 72 of the drain pan 70 to the drain hole 6a. A bottom face 61 of this groove 60 is provided as a downwardly tilted face SS that extends from the dropping point to the drain hole 6a. In operation, oil dropped from the drain pan 70 into the groove 60 will be guided by the tilting of the bottom face 61 and opposed lateral faces 62 of the groove 60 to flow into the drain hole 6a smoothly. Namely, the drain pan 70, the groove 60 (the tilted face SS) and the drain hole 6a together form a simple and effective oil drain arrangement for the oil filter 7.

Figure 5:
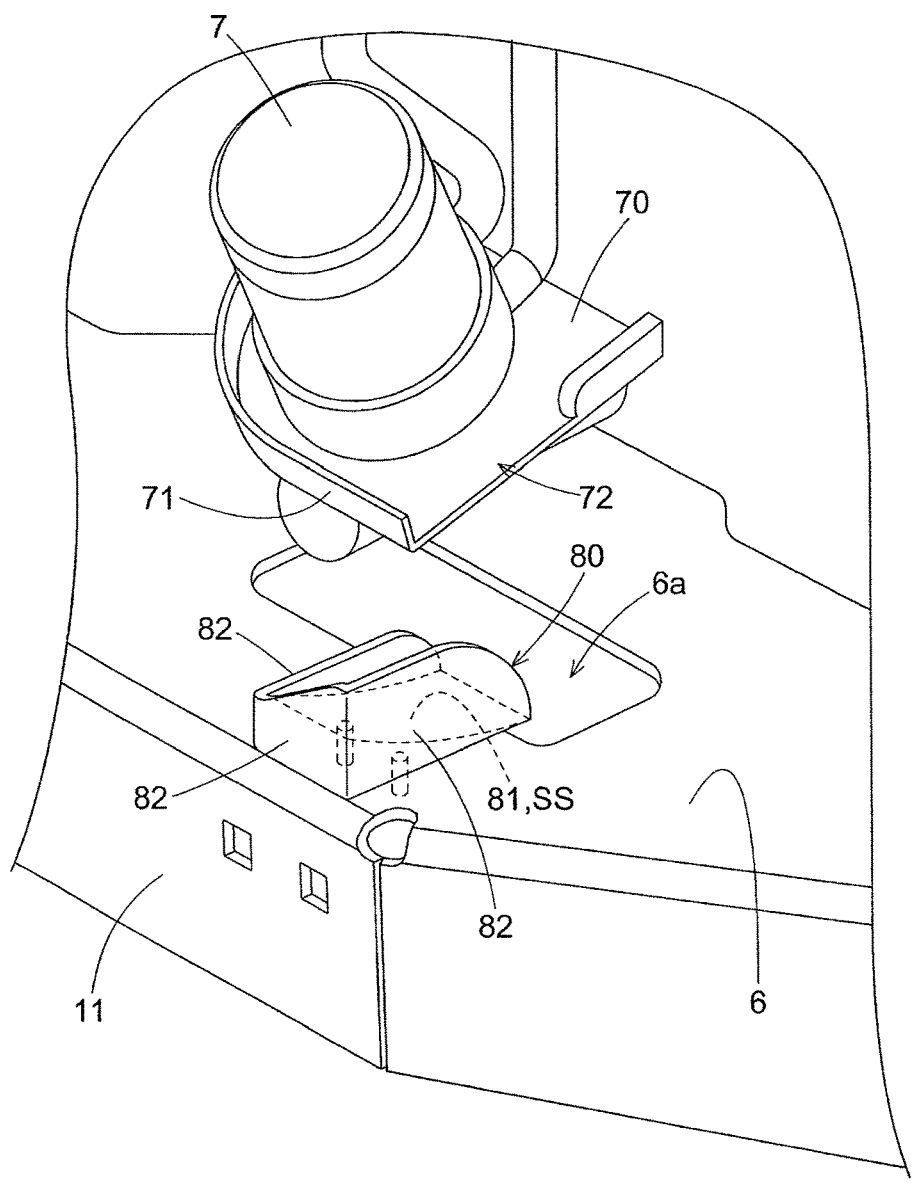
FIG. 5 is a perspective view showing a further embodiment of an oil drain arrangement of the oil filter.
Figure 6:
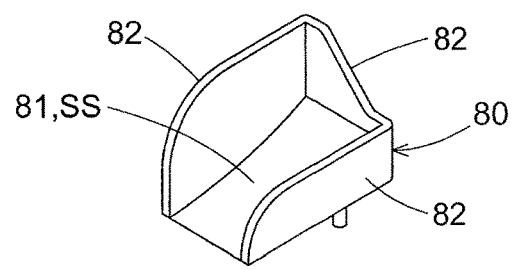
FIG. 6 is a perspective view showing a sub drain pan.

FIG. 5 and FIG. 6 show an oil drain arrangement for the oil filter 7 according to a further embodiment. Here, instead of the groove 60, a sub drain pan 80 is provided. This sub drain pan 80 comprises a box-like body having a length extending from the dropping point on the reinforcing plate 6 for oil discharged from the discharge outlet 72 of the drain pan 70 to the drain hole 6a and includes a bottom plate 81 acting as the tilted face SS and lateral plates 82 acting as guide walls for oil. The sub drain pan 80 is fixed to the reinforcing plate 6 by e.g. welding in such a manner that the bottom plate 81 is placed in abutment against the reinforcing plate 6. At the position where the bottom plate 81 faces the drain hole 6a, the lateral plates 82 are absent, thus forming an outlet of the sub drain pan 80. The face of the bottom plate 81 forming the tilted face SS is tilted downwards from one end to the other end thereof. With this arrangement of the sub drain pan 80, oil dropped from the discharge outlet 72 will be received by one end of the bottom plate 81 and this received oil will then flow along the bottom plate 81, i.e. the tilted face SS and will then flow from the other end of the bottom plate 81 into the drain hole 6a.

The lateral plates 82 of the side drain pan 80 act also as "ribs", which increase the strength of the side drain pan 80. With utilization of the strength of this sub drain pan 80, the dimensions and layout of the sub drain pan 90 can be determined so as to compensate for reduction of the strength of the reinforcing plate 6 due to the formation of the drain hole 6a therein.

Instead of the box-like sub drain pan 80, a plate-like sub drain pan 80 may be employed. In this case, in the sub drain pan 80, a groove similar to the above-described groove 60 will be formed.

In the foregoing embodiment, as an example of oil equipment, the oil filter 7 was cited. However, as an oil equipment to which the present invention is applicable, any oil equipment can be used from which oil is discharged at the time of use or maintenance.

The invention claimed is:

1. A work vehicle comprising:
   a vehicle body frame supported on a ground surface by wheels;
   an engine mounted on the vehicle body frame;
   an oil equipment using oil;
   a drain pan configured to receive and discharge the oil discharged from the oil equipment;
   a reinforcing plate provided in and reinforcing the vehicle body frame and being configured to face the ground surface under the drain pan, the reinforcing plate defining a drain hole extending vertically therethrough; and
   a tilted face provided in a face of the reinforcing plate, the tilted face extending with a downward inclination from a dropping point on the reinforcing plate for the oil discharged from the drain pan to the drain hole.

2. The work vehicle according to claim 1, wherein the tilted face comprises a bottom face of a groove formed directly in the surface of the reinforcing plate.

3. The work vehicle according to claim 1, further comprising:
   a sub drain pan configured to receive oil from the drain pan; and
   the sub drain pan forming the tilted face and also an outlet for causing the oil running on the tilted face to flow into the drain hole.

4. The work vehicle according to claim 3, wherein the sub drain pan acts as a reinforcing member for compensating for shortage of strength of the reinforcing plate due to formation of the drain hole therein.

5. The work vehicle according to claim 4, wherein the sub drain pan includes ribs formed vertically along a circumference of the tilted face, the ribs guiding the oil and increasing the strength of the sub drain pan.

\* \* \* \* \*